US012796688B2

(12) United States Patent
Imai et al.

(10) Patent No.: US 12,796,688 B2
(45) Date of Patent: Nov. 17, 2026

(54) DISINFECTANT COMPOSITION

(71) Applicant: OTSUKA PHARMACEUTICAL FACTORY, INC., Tokushima (JP)

(72) Inventors: Kaoru Imai, Tokushima (JP); Hisae Nishioka, Tokushima (JP); Akihumi Hagi, Tokushima (JP); Shinji Oda, Tokushima (JP); Kazumasa Hashimoto, Tokushima (JP); Motoya Kikuchi, Tokushima (JP)

(73) Assignee: OTSUKA PHARMACEUTICAL FACTORY, INC., Tokushima (JP)

( * ) Notice: Subject to any disclaimer, the term of this patent is extended or adjusted under 35 U.S.C. 154(b) by 300 days.

(21) Appl. No.: 18/799,282

(22) Filed: Aug. 9, 2024

(65) Prior Publication Data

US 2024/0397950 A1 Dec. 5, 2024

Related U.S. Application Data

(63) Continuation of application No. 17/258,579, filed as application No. PCT/JP2019/027803 on Jul. 12, 2019, now abandoned.

(30) Foreign Application Priority Data

Jul. 18, 2018 (JP) ................................ 2018-135190

(51) Int. Cl.
*A01N 47/44* (2006.01)
*A01N 31/02* (2006.01)

(52) U.S. Cl.
CPC ............ *A01N 47/44* (2013.01); *A01N 31/02* (2013.01)

(58) Field of Classification Search
CPC . A01N 47/44; A01N 31/02; A01P 1/00; A61P 31/04; A61P 31/10; A61P 31/12; A61K 31/155; A61K 47/10; A23L 33/10
See application file for complete search history.

(56) References Cited

U.S. PATENT DOCUMENTS

| | | | |
|---|---|---|---|
| 9,555,015 B2 | 1/2017 | Mason | |
| 2006/0189500 A1 | 8/2006 | Miyata et al. | |
| 2007/0053942 A1 | 3/2007 | Nishibayashi et al. | |
| 2010/0168638 A1 | 7/2010 | Korogi | |
| 2010/0331423 A1 | 12/2010 | Miyata et al. | |
| 2011/0117032 A1 | 5/2011 | Gilding | |
| 2019/0000783 A1 | 1/2019 | Shiozaki et al. | |

FOREIGN PATENT DOCUMENTS

| | | | |
|---|---|---|---|
| AU | 2016367754 | 5/2018 | |
| CN | 107646862 A * | 2/2018 | ............ A01N 47/44 |
| CN | 107668062 | 2/2018 | |
| EP | 1 634 499 | 3/2006 | |
| EP | 2 797 413 | 11/2014 | |
| JP | 2005-289959 | 10/2005 | |
| JP | 2007-045732 | 2/2007 | |
| JP | 2007-217394 | 8/2007 | |
| JP | 2017-171606 | 9/2017 | |
| WO | 2004/105492 | 12/2004 | |
| WO | WO 204/105492 A1 * | 12/2004 | .......... A61K 31/155 |
| WO | 2012094009 | 7/2012 | |
| WO | 2013/098547 | 7/2013 | |

OTHER PUBLICATIONS

"Olanexidine solution 1.5% antiseptic applicator 10 mL/25 mL", Aug. 2015, partial translation.
"Clorhexidina gluconate solution", Pharmaceutical Product Interview Form, Jul. 2010, partial translation.
Mcdonnell et al., "Antiseptics and Disinfectants: Activity, Action, and Resistance", Clin Microbiol Reviews, vol. 12, No. 1, Jan. 1999, pp. 147-179.
Wiegand et al., "pH Influence on Antibacterial Efficacy of Common Antiseptic Substances", Skin Pharmacol Physiol.; 28(3), pp. 147-158.
"Opinion on the safety of poly(hexamethylene) biguanide hydrochloride (PHMB)", Scientific Committee on Consumer Safety , Jul. 2015.
"Vantocil IB Antimicrobial Technical information materials".
"Arch Chemicals Reports that Studies Confirm that Vantocil (TM) Product Controls Norovirus, a Leading Cause of Acute Gastroenteritis", https://www.businesswire.com/news/home/20060113005294/en/Arch-Chemicals-Reports-Studies-Confirm-Vantocil-TM, Jan. 13, 2006.
ISR issued in WIPO Patent Application No. PCT/JP2019/027803, dated Sep. 17, 2019, English translation.
Hagi et al. "Bactericidal Effects and Mechanism of Action of Olanexidine Gluconate, a New Antiseptic" (Aug. 2015) Antimicrobial Agents and Chemotherapy, vol. 59, No. 8, pp. 4551-4559.
Ronja Pogan et al., "Norovirus assembly and stability", ScienceDirect, Current Opinion in Virology 2018, 31:59-65, www.sciencedirect.com.
E. Jonczyk et al., "The influence of external factors on bacteriophages—review", Folia Microbiol (2011) 56:191-200, published May 31, 2011.
Hikaru Nakata et al., Journal of Medical Microbiology; 66:678-685 (2017).

* cited by examiner

*Primary Examiner* — Rebecca L Anderson
*Assistant Examiner* — David M Shim
(74) *Attorney, Agent, or Firm* — GREENBLUM & BERNSTEIN, P.L.C.

(57) ABSTRACT

An antiseptic composition with a more extended applicable range by further enhancing the efficacy of olanexidine gluconate, which has been used as a highly safe dermal bactericidal disinfectant, and extending antibacterial spectrum. The antiseptic composition includes olanexidine gluconate and is basic and has a more extended bactericidal spectrum than conventional disinfectants.

20 Claims, 3 Drawing Sheets

[Fig. 1]
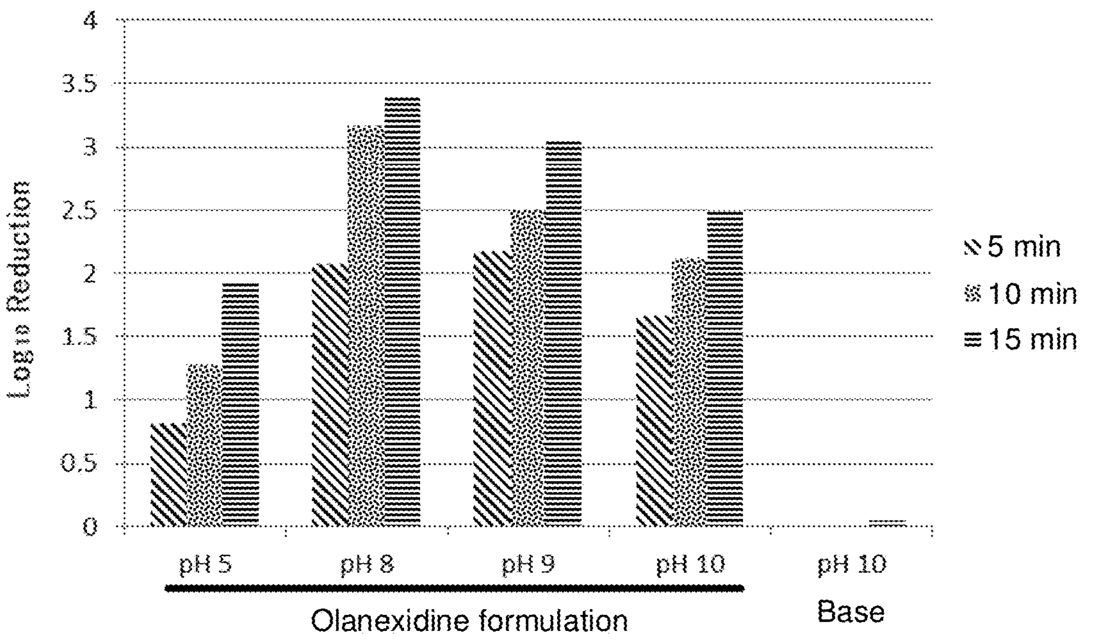
[Fig. 2]
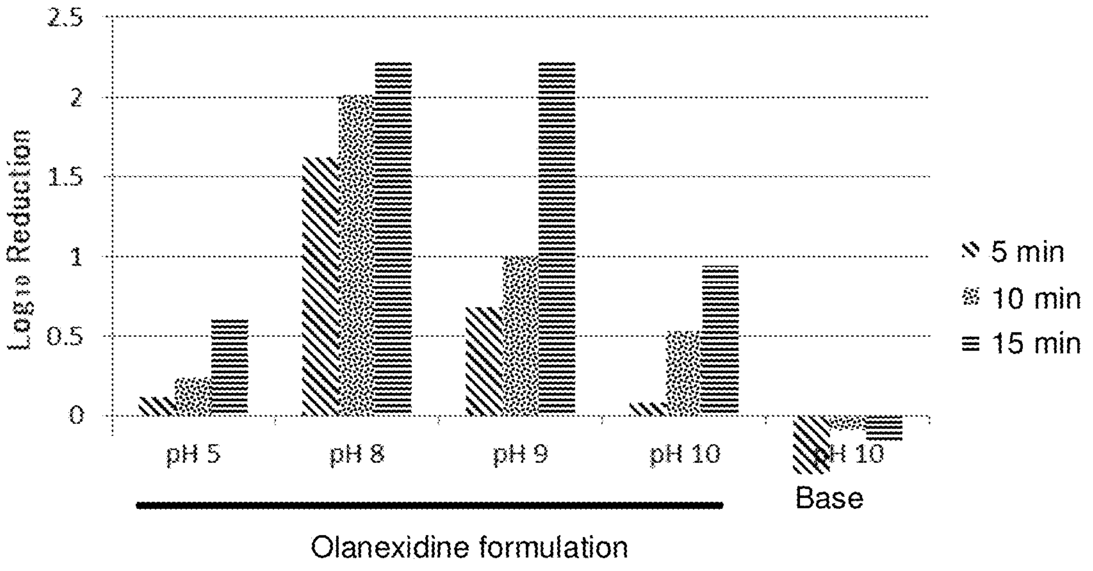

[Fig. 3]
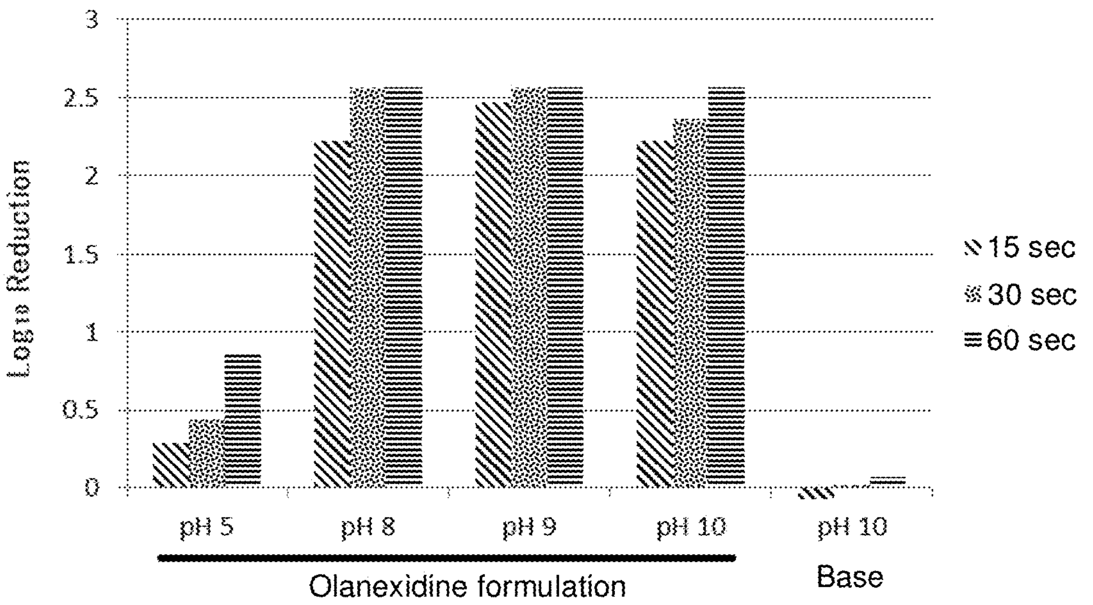
[Fig. 4]
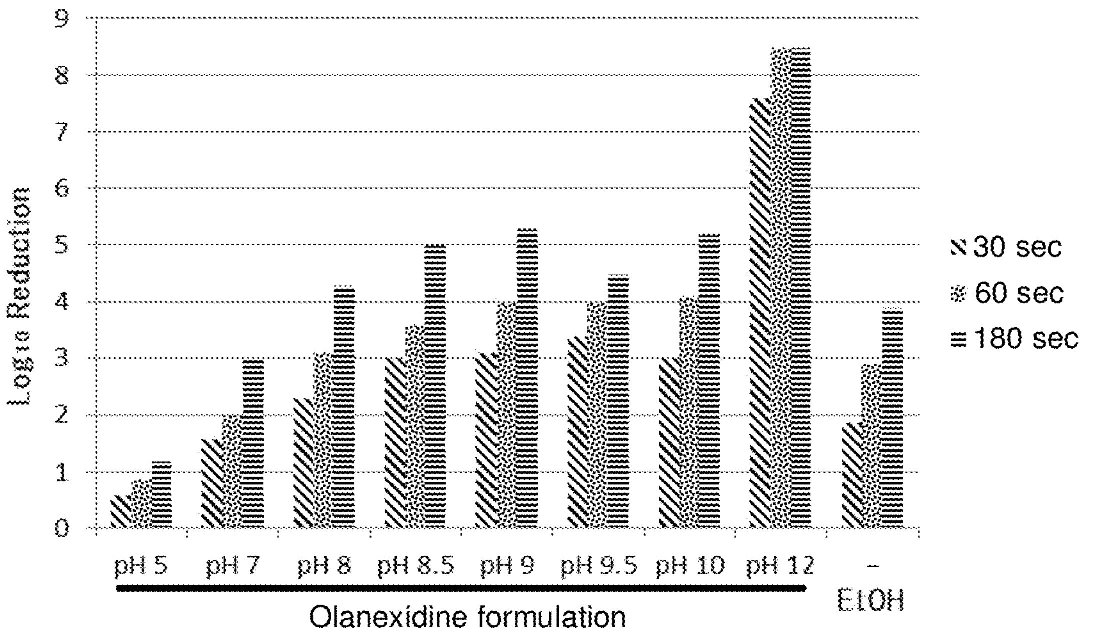

[Fig. 5]
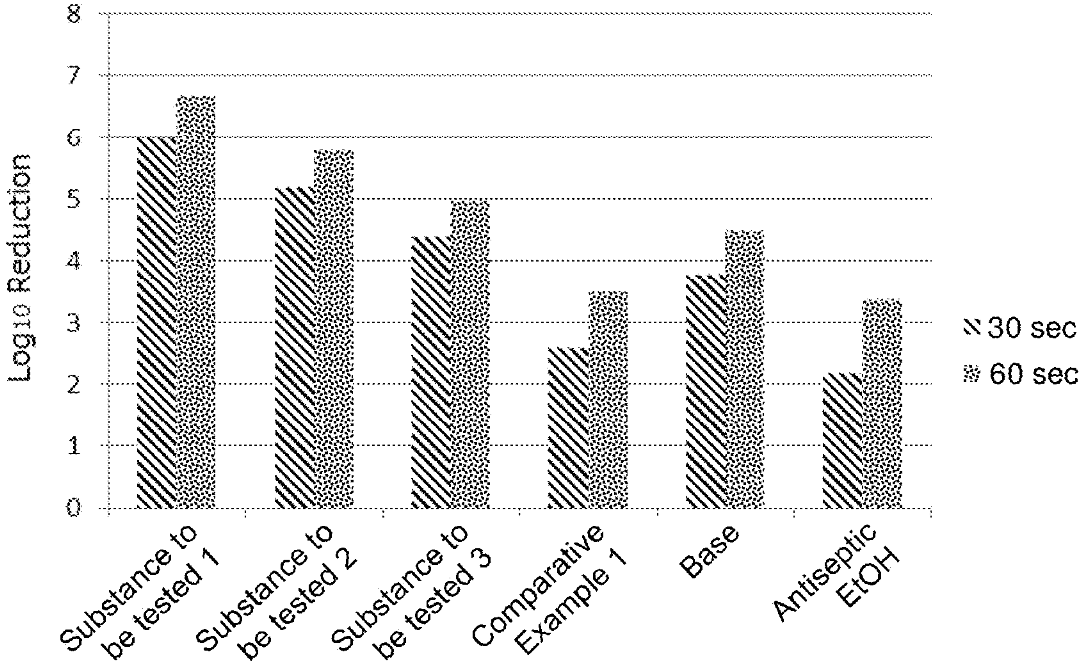

DISINFECTANT COMPOSITION

This application is a Continuation of U.S. patent application Ser. No. 17/258,579, which is a U.S. National Stage Entry of International Patent Application No. PCT/JP2019/027803, filed Jul. 12, 2019, and which claims the benefit of Japanese Patent Application No. 2018-135190, filed Jul. 18, 2018. The disclosure of each of the applications listed above is incorporated by reference herein in its entirety.

TECHNICAL FIELD

The present invention relates to an antiseptic composition (disinfectant composition) containing olanexidine gluconate and having a broader bactericidal spectrum.

BACKGROUND ART

Olanexidine, chemical name 1-(3,4-dichlorobenzyl)-5-octylbiguanide, is a compound with a high bactericidal activity. Olanexidine gluconate has sufficient water solubility, a broad bactericidal spectrum, demonstrates a bactericidal effect in a short time, further sustains such an effect for an extended period of time, and is highly safe, thereby to be useful as a medical disinfectant (Patent Document 1). Dermal bactericidal disinfectants containing olanexidine gluconate have good efficacy on various bacteria which are considered as normal bacteria on skin and enveloped viruses, while substantially have no efficacy on feline calicivirus which has no envelope (Non-patent Document 1). For this reason, in the fields such as medical and nursing, and food and drink industries, olanexidine gluconate-containing disinfectants having more efficacies with a broader bactericidal spectrum are in demand.

Olanexidine belongs to monobiganide-based compounds which have 1 biganide structure. Examples of the disinfectant having the same biganide structure representatively include chlorhexidine, which is a bisbiganide-based compound, and polyhexamethylene biguanide, which is a polybiganide-based compound.

Chlorhexidine is a bisbiganide-based compound having 2 biganide structures in a molecule. As with olanexidine, chlorhexidine is hardly water-soluble and becomes soluble in the form of gluconate, for the reason of which it is mainly used in the form of chlorhexidine gluconate as a pharmaceutical product (Non-patent Document 2). Chlorhexidine gluconate, as with olanexidine gluconate, shows a viricidal action on enveloped viruses, while having no efficacy on non-enveloped viruses (Non-patent Document 3). Further, chlorhexidine gluconate is stable at pH 4 to 6.5 and is known to cause precipitation when a dilute aqueous solution is basic of pH 8 or more and cause no difference in the bactericidal efficacies even when pH is increased (Patent Document 2, Non-patent Document 2, and Non-patent Document 4).

On the other hand, polyhexamethylene biganide, classified as a polybiganide-based compound, is a polymer of hexamethylene biganide having 1 biganide structure in a unit. Polyhexamethylene biganide is extremely easily soluble in water and has a broad bactericidal spectrum, for the reason of which a mild acidic solution thereof is commonly available as a low toxic sterilizing agent (Non-patent Documents 5 and 6). Further, commercial polyhexamethylene biganide disinfectants are reported as having viricidal activities on non-enveloped viruses (Non-patent Document 7) and further reported as increasing bactericidal efficacy and viricidal efficacy when pH is further increased (Non-patent Document 4 and Patent Documents 3 and 4).

PRIOR ART DOCUMENTS

Patent Documents

[Patent Document 1] Japanese unexamined Patent Application Publication No. 2005-289959

[Patent Document 2] Japanese unexamined Patent Application Publication No. 2007-217394

[Patent Document 3] Japanese unexamined Patent Application Publication No. 2007-045732

[Patent Document 4] Japanese unexamined Patent Application Publication No. 2017-171606

Non-Patent Documents

[Non-patent Document 1] Attached document "Olanexidine solution 1.5% antiseptic applicator 10 mL/25 mL" (August, 2015 Revised)

[Non-patent Document 2] Pharmaceutical Product Interview Form "Chlorhexidine gluconate solution" (July, 2010 Revised)

[Non-patent Document 3] Clin Microbiol Rev.; 12(1): 147-179 (January, 1999)

[Non-patent Document 4] Skin Pharmacol Physiol.; 28(3): 147-158 (2015)

[Non-patent Document 5] Scientific Committee on Consumer Safety "Opinion on the safety of poly(hexamethylene) biguanide hydrochloride (PHMB)" (July, 2015)

[Non-patent Document 6] VANTOCIL IB Antimicrobial Technical information materials

[Non-patent Document 7] Website "Arch Chemicals Reports that Studies Confirm that Vantocil™ E Product Controls Norovirus, a Leading Cause of Acute Gastroenteritis" (www.businesswire.com/news/home/20060113005294/en/Arch-Chemicals-Reports-Studies-Confirm-Vantocil-TM)

SUMMARY OF THE INVENTION

Object to be Solved by the Invention

An object of the present invention is to provide an antiseptic composition with a more extended applicable range by further enhancing the efficacy of olanexidine gluconate, which has been used as a highly safe dermal bactericidal disinfectant, and extending bactericidal spectrum.

Means to Solve the Object

The present inventors continued extensive studies to solve the above object. Conventional bactericides containing olanexidine gluconate were formulated to be pH 5 (Non-patent Document 1) because compositions applied to skins are generally mildly acidic according to pH (pH 4 to 7) of skins and olanexidine deposits in the form of a free compound when neutralized with an alkaline aqueous solution (Patent Document 1), however, the present inventors intentionally prepared a basic solution of olanexidine gluconate to test activities thereof and found that bactericidal efficacies are not only unexpectedly enhanced but efficacies are demonstrated on non-enveloped viruses against which a mildly acidic formulation thereof had substantially no efficacy. Further, the present inventors confirmed that further addition of a surfactant to a basic solution containing olanexidine gluconate enhances the stability. The present invention is based on the above findings.

More specifically, the present invention is as follows.

(1) An antiseptic composition comprising olanexidine gluconate, wherein the antiseptic composition is basic.

(2) The antiseptic composition according to (1), having a pH within a range from 8 to 11.

(3) The antiseptic composition according to (1) or (2), wherein a concentration of olanexidine gluconate is 0.01 to 20% (W/V).

(4) The antiseptic composition according to any one of (1) to (3), comprising water and/or an antiseptic alcohol.

(5) The antiseptic composition according to (4), wherein a concentration of the antiseptic alcohol concentration is 10 to 85% (V/V).

(6) The antiseptic composition according to (4) or (5), wherein the antiseptic alcohol is selected from ethanol and isopropyl alcohol.

(7) A rubbing agent comprising the antiseptic composition according to any one of (1) to (6).

Effect of the Invention

According to a composition of the present invention, a disinfectant usable in the fields such as medical and nursing, and food and drink industries and having higher efficacy with a broader bactericidal spectrum can be produced.

BRIEF DESCRIPTION OF DRAWINGS

FIG. 1 is a chart showing bactericidal powers of olanexidine gluconate-containing compositions (pH 5, 8 to 10) of Example 1 against *Mycobacterium fortuitum* JCM 6387.

FIG. 2 is a chart showing bactericidal powers of olanexidine gluconate-containing compositions (pH 5, 8 to 10) of Example 1 against *Mycobacterium chelonae* JCM 6388.

FIG. 3 is a chart showing bactericidal powers of olanexidine gluconate-containing compositions (pH 5, 8 to 10) of Example 1 against *Microsporum canis* NBRC 32464.

FIG. 4 is a chart showing viricidal (phage) activities of olanexidine gluconate-containing compositions (pH 5, 7 to 12) of Example 2 on phage.

FIG. 5 is a chart showing a viricidal (phage) activity of ethanol-containing olanexidine formulation of Example 3 on phage.

MODE OF CARRYING OUT THE INVENTION

The present invention relates to an antiseptic composition which comprises olanexidine gluconate and is basic. Being basic used herein may be any composition of pH being more than 7 but examples include, in view of toxicity and a bactericidal activity to skins, pH being more than 7 to 12, pH being more than 7 to 11.5, pH being more than 7 to 11, pH being more than 7 to 10.5, and pH being more than 7 to 10; preferably pH 7.5 to 12, pH 7.5 to 11.5, pH 7.5 to 11, pH 7.5 to 10.5, and pH 7.5 to 10; more preferably pH 8 to 11.5, pH 8 to 11, pH 8 to 10.5, pH 8 to 10; further preferably pH 8.5 to 11.5, pH 8.5 to 11, pH 8.5 to 10.5, and pH 8.5 to 10; and furthermore preferably pH 9 to 12, pH 9 to 11.5, pH 9 to 11, pH 9 to 10.5, and pH 9 to 10. Note that the composition of the present invention is an aqueous solution. Further, in the present Description, the "disinfection" and "bactericidal" mean to kill bacteria, fungi and/or viruses.

Any known pH adjuster can be used to adjust the pH, but examples include a basic solution such as sodium hydroxide, potassium hydroxide, calcium hydroxide, ammonium carbonate, and potassium carbonate, of which sodium hydroxide is preferable. Further, the composition of the present invention is optionally prepared using a basic buffer, and examples of the buffer used include a boric acid-sodium carbonate buffer, a CAPS-NaOH buffer, a Bicine-NaOH buffer, a Glycine-NaOH buffer, a Tricine-NaOH buffer, a HEPPS-NaOH buffer, a TAPS-NaOH buffer, a Bicine-NaOH buffer, and a HEPES-NaOH buffer.

The concentration of olanexidine gluconate is not particularly limited as long as it has sufficient bactericidal efficacy, but examples include 0.01 to 20% (W/V), preferably 0.1 to 10% (W/V), and more preferably 0.5 to 5% (W/V). When the antiseptic alcohol to be described later is used concurrently, examples of such a concentration include 0.01 to 10% (W/V), preferably 0.1 to 7% (W/V), more preferably 0.5 to 5% (W/V), and further preferably 0.5 to 3% (W/V).

A composition of the present invention has more promoted bactericidal activities on filamentous fungi and acid-fast bacteria, particularly bacteria of the genus *Microsporum* and bacteria of the genus *Mycobacterium*. Further, the present composition also has good viricidal activities even on non-enveloped viruses, particularly viruses of the family *Caliciviridae* (viruses of the genus *Norovirus*), against which the conventional olanexidine gluconate-containing disinfectants failed to inactivate.

A composition of the present invention further optionally contains an antiseptic alcohol to potentiate bactericidal activities and impart quick-dryness. Examples of the antiseptic alcohol herein preferably include ethanol and isopropyl alcohol, and examples of the antiseptic alcohol concentration include 10 to 85% (V/V), 20 to 85% (V/V), 30 to 85% (V/V), 40 to 85% (V/V), 50 to 85% (V/V), 10 to 80% (V/V), 20 to 80% (V/V), 30 to 80% (V/V), 40 to 80% (V/V), 50 to 80% (V/V), 10 to 70% (V/V), 20 to 70% (V/V), 30 to 70% (V/V), 40 to 70% (V/V), and 50 to 70% (V/V). A composition of the present invention may not substantially contain an antiseptic alcohol. Containment of the antiseptic alcohol enables to prepare a quick-drying disinfectant having both potentiating effects of bactericidal activities due to the antiseptic alcohol and sustained effects of bactericidal activities due to olanexidine gluconate. Further, as bactericidal activities are potentiated due to the antiseptic alcohol, a concentration of olanexidine gluconate can be reduced. Examples of the concentration ratio of the olanexidine gluconate to the antiseptic alcohol include 1:400 to 1:20, preferably 1:300 to 1:30, and more preferably 1:200 to 1:40.

A composition of the present invention can further contain a known bactericide. Examples of the bactericide include a benzalkonium salt such as benzalkonium chloride and benzalkonium alkyl phosphate, benzethonium chloride, triclosan, isopropyl methylphenol, cetylpyridinium chloride, resorcin, trichlorocarbanilide, chlorhexidine hydrochloride, chlorhexidine gluconate, polyhexamethylene biganide, sodium hypochlorite, hydrogen peroxide, povidone iodine, and iodine tincture. These bactericides are optionally used singly or 2 or more may be used in combination.

A composition of the present invention can further contain a known solubilizer. Examples of the solubilizer include a nonionic surfactant, an ionic surfactant, ethylenediamine, sodium benzoate, nicotinamide, cyclodextrin, ethanol, benzyl alcohol, and propylene glycol. Examples of the ionic surfactant preferably include an alkyl dimethylamine oxide such as an oleyl dimethylamine oxide, a stearyl dimethylamine oxide, palmityl dimethylamine oxide, a myristyl dimethylamine oxide, a lauryl dimethylamine oxide, and a coconut oil alkyl dimethylamine oxide, of which a lauryl dimethylamine oxide is preferable. Examples of the nonionic surfactant include a sorbitan fatty acid ester, a polyoxyethylene sorbitan fatty acid ester, a polyoxyethylene alkyl ether, a polyoxyethylene polyoxypropylene alkyl ether, polyoxyethylene polyoxypropylene glycol, a polyglyceryl fatty acid ester, a polyoxyethylene hydrogenated castor oil, and a sucrose fatty acid ester, of which polyoxyethylene polyoxypropylene glycol, a polyoxyethylene alkyl ether, and a polyoxyethylene polyoxypropylene alkyl ether are preferable. Examples of the polyoxyethylene polyoxypropylene glycol include polyoxyethylene(42) polyoxypropylene(67) glycol (Pluronic (R) P-123), polyoxyethylene(54) polyoxypropylene(39) glycol (Pluronic (R) P-85), polyoxyethylene (196) polyoxypropylene (67) glycol (Pluronic (R) F-127), polyoxyethylene(3) polyoxypropylene(17) glycol (Pluronic (R) L-31), polyoxyethylene(20) polyoxypropylene(20) glycol (Pluronic (R) L-44), polyoxyethylene(120) polyoxypropylene(40) glycol (Pluronic (R) F-87), and polyoxyethylene (160) polyoxypropylene(30) glycol (Pluronic (R) F-68), of which polyoxyethylene(20) polyoxypropylene(20) glycol (Pluronic (R) L-44) is preferable. Examples of the polyoxyethylene alkyl ether include a polyoxyethylene cetylether, a polyoxyethylene oleyl ether, and a polyoxyethylene lauryl ether (lauromacrogol), with a polyoxyethylene lauryl ether (lauromacrogol) being particularly preferable. Further, examples of the polyoxyethylene polyoxypropylene alkyl ether include a polyoxyethylene(20) polyoxypropylene(4) cetylether, a polyoxyethylene(30) polyoxypropylene(6) decyltetradecyl ether, a polyoxyethylene(25) polyoxypropylene(25) lauryl ether, with a polyoxyethylene(20) polyoxypropylene(4) cetylether being particularly preferable. The concentration of a solubilizer may be a concentration which prevents olanexidine gluconate from precipitating and does not reduce the bactericidal activity and is usually determined in accordance with a concentration of olanexidine gluconate within a concentration range of 0.1 to 30% (W/V).

A composition of the present invention optionally contains an anti-inflammatory agent, a moisturizer, an emollient agent, a touch improver, and a thickener.

Examples of the anti-inflammatory agent include a licorice extract, glycyrrhetinic acid, dipotassium glycyrrhizinate, stearyl glycyrrhetinate, tocopherol acetate, allantoin, and an aloe extract.

Example of the moisturizer include an amino acid, a fatty acid ester, pyrrolidone carboxylic acid, sodium pyrrolidone carboxylate, sodium lactate, hyaluronic acid, sodium hyaluronate, N-cocoyl-L-arginine ethyl ester-DL-pyrrolidone carboxylate, urea, sorbitol, trehalose, 1,3-butylene glycol, propylene glycol, poloxamer (Pluronic (R) F-68, etc.), and glycerin.

Examples of the emollient include a fatty acid ester such as isopropyl myristate, isopropyl palmitate, isopropyl stearate, isobutyl oleate, and isobutyl maleate, and 1 fatty acid ester singly or 2 or more of these can be contained.

Examples of the touch improver include a silicone-based compound such as dimethylpolysiloxane and cyclic silicone.

Examples of the thickener include a cellulose derivative such as hydroxyethyl cellulose, hydroxypropyl cellulose, hydrophobic hydroxypropyl methylcellulose, cellulose, and carboxymethyl cellulose, a methyl (meth)acrylic acid base copolymer, polyvinyl alcohol, polyvinylpyrrolidone, a methyl vinyl ether-maleic anhydride copolymer, polyacrylamide, alginic acid, sodium alginate, propylene glycol alginate, gelatin, a gum arabic, a gum tragacanth, a locust bean gum, a guar gum, a tamarind gum, a xanthan gum, a gellan gum, and carrageenan.

A composition of the present invention can preferably be used for the purpose of disinfecting the instrument surfaces of medical instruments, cookware, and nursing equipment, and skin surfaces such as hands and fingers. A composition of the present invention is optionally used as soaked in a substrate such as paper, cloth, non-woven fabric, cotton swab, or absorbent cotton, or as filled in an applicator for application, or in the form of a rubbing agent or a scrubbing agent, but a composition of the present invention is preferably used as a rubbing agent. The rubbing agent herein means a quick-drying rubbing-type formulation, and the scrubbing agent means a formulation obtained by mixing a bactericide/disinfectant and a surfactant having detergency. Note that when a composition of the present invention is used for disinfecting fingers of both hands, an amount usually used per disinfection is 1 to 5 ml, preferably 1.5 to 4.5 ml, more preferably 2 to 4 ml, and further preferably 2.5 to 3.5 ml, and examples of the number of times used per day include, in view of dermal toxicity, within 100 times, preferably within 80 times, more preferably within 60 times, and further preferably within 40 times.

Hereinafter, the present invention will be described more specifically in reference to examples, but technical ranges of the present invention are not limited thereto.

Example 1

1. Bactericidal Power Against Fungi and Non-tuberculous Mycobacteria

Bactericidal power of olanexidine gluconate containing-compositions (pH5, 8 to 10) against filamentous fungi and non-tuberculous mycobacteria, which are known to cause infections, was evaluated by Time-kill test.

1-1 Test Material and Method

1-1-1 Test Substances

| | |
|---|---|
| (1) Substance to be tested 1 | |
| Name: Olanexidine formulation pH 5 | |
| Composition: Olanexidine gluconate | 1.5% (W/V) |
| Pluronic L-44 | 1.08% (W/V) |
| pH Adjuster (sodium hydroxide, glucono-δ-lactone) | qs |
| Pure water | qs |
| pH 5 | |
| (2) Substance to be tested 2 | |
| Name: Olanexidine formulation pH 8 | |
| Composition: Olanexidine gluconate | 1.5% (W/V) |
| Pluronic L-44 | 1.08% (W/V) |
| HEPES | 0.1% (W/V) |
| pH Adjuster (sodium hydroxide, glucono-δ-lactone) | qs |
| Pure water | qs |
| pH 8 | |
| (3) Substance to be tested 3 | |
| Name: Olanexidine formulation pH 9 | |
| Composition: Olanexidine gluconate | 1.5% (W/V) |
| Pluronic L-44 | 4.08% (W/V) |
| Glycine | 0.1% (W/V) |
| pH Adjuster (sodium hydroxide, glucono-δ-lactone) | qs |
| Pure water | qs |
| pH 9 | |
| (4) Substance to be tested 4 | |
| Name: Olanexidine formulation pH 10 | |
| Composition: Olanexidine gluconate | 1.5% (W/V) |
| Pluronic L-44 | 16.08% (W/V) |

-continued

| | |
|---|---|
| Glycine | 0.1% (W/V) |
| pH Adjuster (sodium hydroxide, glucono-δ-lactone) | qs |
| Pure water | qs |
| pH 10 | |
| (5) Control substance | |
| Name: Base pH 10 | |
| Composition: Pluronic L-44 | 1.08% (W/V) |
| Glycine | 0.1% (W/V) |
| pH Adjuster (sodium hydroxide, glucono-δ-lactone) | qs |
| Pure water | qs |
| pH 10 | |

1-1-2 Medium (1) 7H10 Plate

To 19 g of Difco Middlebrook 7H10 Agar (product number: 262710, manufactured by Becton, Dickinson and Company), 5 mL of glycerol (product number: 070-04941, manufactured by Wako Pure Chemical Industries, Ltd.) and 900 mL of pure water were added and stirred. The medium was steam-sterilized under pressure (121 °C, 20 minutes). After sterilization, the medium was taken out from the pressure steam sterilizer, cooled to 50 to 55 °C with stirring, and subsequently 100 mL of BBL Middlebrook OADC Enrichment (product number: 212240, manufactured by Becton, Dickinson and Company) was added and stirred. About 20 mL each of the agar, before set, was dispensed in petri dishes and allowed to be solidified.

(2) SAB Plate

To 65 g of a Sabouraud agar medium “Nissui” (product number: 05701, manufactured by NISSUI PHARMACEUTICAL CO., LTD.), 1000 mL of pure water was added and stirred. The medium was steam-sterilized under pressure (121 °C, 20 minutes). About 20 mL each of the agar, before set, was dispensed in petri dishes and allowed to be solidified.

(3) SABLP Plate

To 73 g of a Sabouraud-Dextrose LP Agar medium “DAIGO” (product code: 392-01875, manufactured by NIHON PHARMACEUTICAL CO., LTD.), 1000 mL of pure water was added and stirred. The medium was steam-sterilized under pressure (121 °C, 20 minutes). About 20 mL each of the agar, before set, was dispensed in petri dishes and allowed to be solidified.

1-1-3 Neutralizer

To about 800 mL of distilled water, 100 g of polysorbate 80, 5.0 g of a sodium thiosulfate hydrate, 0.4 g of potassium dihydrogen phosphate, 1 mL of Triton X-100, 10.1 g of disodium hydrogen phosphate anhydrous, and 11.7 g of soy lecithin were added and stirred. Further, 10.0 g of Tamol (R) NN8906 was added, and heated and stirred until dissolved. After dissolution, a 1 mol/L sodium hydroxide solution was added to adjust pH to 7.8 to 7.9. Distilled water was added until the total amount was 1000 mL, and then steam-sterilization under pressure was carried out.

1-1-4 Test Microorganisms

For test microorganisms, filamentous fungus *Microsporum canis* NBRC 32464, acid-fast bacteria *Mycobacterium chelonae* JCM 6388 and *Mycobacterium fortuitum* JCM 6387 were used. Each of the test microorganisms was cultured on the 7H10 plate (*Mycobacterium chelonae* and *Mycobacterium fortuitum*) or the SAB plate (*Microsporum canis*), and then suspended in distilled water to prepare test microorganism solutions of McFarland No. 1 (*Mycobacterium chelonae* and *Mycobacterium fortuitum*) or of McFarland No. 5 (*Microsporum canis*).

1-2 Bactericidal Power Evaluation Test

1-2-1 Measurement of Initial Viable Cell Counts (*Mycobacterium chelonae* and *Mycobacterium fortuitum*)

(1) To 3 mL of distilled water, 150 μL of the test microorganism solution was added and mixed.
(2) Immediately, 50 μL of the bacterium mixture was added to 4.95 mL of the neutralizer and mixed. The mixture was prepared to be a $10^2$-fold dilution.
(3) 0.3 mL of the $10^2$-fold dilution was added to 2.7 mL of the neutralizer to dilute 10 times. Dilution was further repeated by the same operation to produce 10-fold dilution series (3 stages in total from $10^2$- to $10^4$-fold dilutions).
(4) 100 μL each of the $10^2$- to $10^4$-fold dilutions was dispensed onto the 7H10 plate and smeared. Steps (2) to (4) were carried out within 30 minutes.
(5) The smear plate was inverted and the cells were cultured until a colony count can be carried out.
(6) The colonies grown in the smear plate were visually counted and the number of colonies was multiplied by a dilution factor to calculate a viable cell count (CFU/mL). However, the smear plates in which the number of colonies is too numerous to distinguish colonies from each other were defined as TNTC (too numerous to count) and not counted.

1-2-2 Measurement of Viable Cell Count After the Test Substances Acted (*Mycobacterium chelonae* and *Mycobacterium fortuitum*)

(1) To 3 mL of the test substance, 150 μL of the test microorganism solution was added and mixed. Using this mixture as a reaction solution, the reaction was carried out at room temperature.
(2) After allowing the reaction to proceed for a predetermined period of time, 50 μL of the reaction solution was extracted, to which 4.95 mL of the neutralizer was added and mixed. This mixture was prepared to be a $10^2$-fold dilution.
(3) 0.3 mL of the $10^2$-fold dilution was added to 2.7 mL of the neutralizer to dilute 10 times. Dilution was further repeated by the same operation to produce 10-fold dilution series (3 stages in total from $10^2$- to $10^4$-fold dilutions).
(4) 100 μL each of the $10^2$- to $10^4$-fold dilutions was dispensed onto the 7H10 plate and smeared.
(5) The smear plate was inverted and the cells were cultured until a colony count can be carried out.
(6) The colonies grown in the smear plate were visually counted and the number of colonies was multiplied by a dilution factor to calculate a viable cell count (CFU/mL).

1-2-3 Measurement of Initial Viable Cell Count (*Microsporum canis*)

(1) To 3 mL of distilled water, 150 μL of the test microorganism solution was added and mixed.

(2) Immediately, 500 μL of the microorganism mixture solution was added to 4.5 mL of the neutralizer and mixed. This mixture was prepared to be a $10^1$-fold dilution.
(3) 0.3 mL of the $10^1$-fold dilution was added to 2.7 mL of the neutralizer to dilute 10 times. Dilution was further repeated by the same operation to produce 10-fold dilution series (3 stages in total from $10^1$- to $10^3$-fold dilutions).
(4) 100 μL each of the $10^1$- to $10^3$-fold dilutions was dispensed onto the SABLP plate and smeared. Steps (2) to (4) were carried out within 30 minutes.
(5) The smear plate was inverted and the cells were cultured until a colony count can be carried out.
(6) The colonies grown in the smear plate were visually counted and the number of colonies was multiplied by a dilution factor to calculate a viable cell count (CFU/mL). However, the smear plates in which the number of colonies is too numerous to distinguish colonies from each other were defined as TNTC and not counted.

1-2-4 Measurement of Viable Cell Count After the Test Substance Acted (*Microsporum canis*)

(1) To 3 mL of the test substance, 150 μL of the test microorganism solution was added and mixed. Using this mixture as a reaction solution, the reaction was carried out at room temperature.
(2) After allowing the reaction to proceed for a predetermined period of time, 500 μL of the reaction solution was extracted, to which 4.5 mL of the neutralizer was added and mixed. This mixture was prepared to be a $10^1$-fold dilution.
(3) 0.3 mL of the $10^1$-fold dilution was added to 2.7 mL of the neutralizer to dilute 10 times. Dilution was further repeated by the same operation to produce 10-fold dilution series (3 stages in total from $10^1$- to $10^3$-fold dilutions).
(4) 100 μL each of the $10^1$- to $10^3$-fold dilutions was dispensed onto the SABLP plate and smeared.
(5) The smear plate was inverted and the cells were cultured until a colony count can be carried out.
(6) The colonies grown in the smear plate were visually counted and the number of colonies was multiplied by a dilution factor to calculate a viable cell count (CFU/mL).

1-2-5 Calculation Formula of $Log_{10}$ Reduction (LR)

$$LR = A - B$$

A: Average value of initial viable cell count (common logarithm value)
B: Viable cell count after each of the test substances acted (common logarithm value)

With *Mycobacterium chelonae* and *Mycobacterium fortuitum*, the mixing ratio of the reaction solution to the neutralizer is 1:99 and the smear amount is 100 μL, because of which the minimum limit of detection of a viable cell count is 1000 CFU/mL (3 in common logarithm value). Further, with *Microsporum canis*, the mixing ratio of the reaction solution to the neutralizer is 1:9 and the smear amount is 100 μL, because of which the minimum limit of detection of a viable cell count is 100 CFU/mL (2 in common logarithm value). When a colony was not detected, the minimum limit of detection was adopted and LR is indicated with a sign of inequality ">".

1-3 Results

The results are shown in Tables 1 to 3 and FIGS. 1 to 3 below.

TABLE 1

Bactericidal power against acid-fast bacterium *Mycobacterium fortuitum* JCM 6387

| Test substance | $Log_{10}$ reduction (mean ± SD) | | |
|---|---|---|---|
| | 5 min (n = 3) | 10 min (n = 6) | 15 min (n = 3) |
| Olanexidine formulation pH 5 | 0.83 ± 0.24 | 1.28 ± 0.33 | 1.94 ± 0.26 |
| Olanexidine formulation pH 8 | 2.08 ± 0.38 | 3.18 ± 0.25 | 3.40 ± 0.00 |
| Olanexidine formulation pH 9 | 2.18 ± 0.28 | 2.51 ± 0.16 | 3.06 ± 0.60 |
| Olanexidine formulation pH 10 | 1.67 ± 0.24 | 2.13 ± 0.30 | 2.51 ± 0.55 |
| Base pH 10 | 0.00 ± 0.02 | 0.02 ± 0.15 | 0.06 ± 0.13 |

TABLE 2

Bactericidal power against acid-fast bacterium *Mycobacterium chelonae* JCM 6388

| Test substance | $Log_{10}$ reduction (mean ± SD, n = 3) | | |
|---|---|---|---|
| | 5 min | 10 min | 15 min |
| Olanexidine formulation pH 5 | 0.12 ± 0.38 | 0.24 ± 0.32 | 0.62 ± 0.53 |
| Olanexidine formulation pH 8 | 1.62 ± 0.65 | 2.02 ± 0.55 | 2.24 ± 0.17 |
| Olanexidine formulation pH 9 | 0.68 ± 0.40 | 1.00 ± 0.24 | 2.24 ± 0.17 |
| Olanexidine formulation pH 10 | 0.08 ± 0.10 | 0.53 ± 0.42 | 0.94 ± 0.22 |
| Base pH 10 | −0.37 ± 0.23 | −0.09 ± 0.22 | −0.17 ± 0.20 |

TABLE 3

Bactericidal power against filamentous fungus *Microsporum canis* NBRC 32464

| Test substance | $Log_{10}$ reduction (mean ± SD, n = 3) | | |
|---|---|---|---|
| | 15 sec | 30 sec | 60 sec |
| Olanexidine formulation pH 5 | 0.29 ± 0.04 | 0.44 ± 0.03 | 0.86 ± 0.05 |
| Olanexidine formulation pH 8 | 2.23 ± 0.35 | >2.57 | >2.57 |
| Olanexidine formulation pH 9 | 2.47 ± 0.17 | >2.57 | >2.57 |
| Olanexidine formulation pH 10 | 2.23 ± 0.35 | 2.37 ± 0.35 | >2.57 |
| Base pH 10 | −0.07 ± 0.04 | 0.02 ± 0.06 | 0.07 ± 0.03 |

The above results revealed that, in all test microorganisms, bactericidal powers of the olanexidine formulations at pH 8 to 10 are more intense than the olanexidine formulation at pH 5. Note that the bactericidal power of the olanexidine formulation at pH 10 is more reduced than the olanexidine formulation at pH 8, but this is considered that the activity was prohibited by Pluronic L-44 added as the solubilizer.

Example 2

2. Action of Olanexidine Formulations on Bacteriophage MS2

Bacteriophage MS2 is known to be resistant to disinfectants and is used for an alternative test such as the norovirus killing action of disinfectants. For this reason, viricidal effects of the olanexidine formulations prepared by changing pH and a commercial disinfectant on a virus were evaluated by a test using bacteriophage MS2.

2-1 Test Material and Method

2-1-1 Test Substances

| | |
|---|---|
| (1) Substance to be tested 1 | |
| Name: Olanexidine formulation pH 5 | |
| Composition: Olanexidine gluconate | 1.5% (W/V) |
| Pluronic L-44 | 1.08% (W/V) |
| pH Adjuster (sodium hydroxide, glucono-δ-lactone) | qs |
| Pure water | qs |
| pH 5 | |
| (2) Substance to be tested 2 | |
| Name: Olanexidine formulation pH 7 | |
| Composition: Olanexidine gluconate | 1.5% (W/V) |
| Pluronic L-44 | 1.08% (W/V) |
| HEPES | 0.1% (W/V) |
| pH Adjuster (sodium hydroxide, glucono-δ-lactone) | qs |
| Pure water | qs |
| pH 7 | |
| (3) Substance to be tested 3 | |
| Name: Olanexidine formulation pH 8 | |
| Composition: Olanexidine gluconate | 1.5% (W/V) |
| Pluronic L-44 | 1.08% (W/V) |
| HEPES | 0.1% (W/V) |
| pH Adjuster (sodium hydroxide, glucono-δ-lactone) | qs |
| Pure water | qs |
| pH 8 | |
| (4) Substance to be tested 4 | |
| Name: Olanexidine formulation pH 8.5 | |
| Composition: Olanexidine gluconate | 1.5% (W/V) |
| Pluronic L-44 | 1.08% (W/V) |
| L-Histidine | 0.1% (W/V) |
| pH Adjuster (sodium hydroxide, glucono-δ-lactone) | qs |
| Pure water | qs |
| pH 8.5 | |
| (5) Substance to be tested 5 | |
| Name: Olanexidine formulation pH 9 | |
| Composition: Olanexidine gluconate | 1.5% (W/V) |
| Pluronic L-44 | 4.08% (W/V) |
| Glycine | 0.1% (W/V) |
| pH Adjuster (sodium hydroxide, glucono-δ-lactone) | qs |
| Pure water | qs |
| pH 9 | |
| (6) Substance to be tested 6 | |
| Name: Olanexidine formulation pH 9.5 | |
| Composition: Olanexidine gluconate | 1.5% (W/V) |
| Pluronic L-44 | 10.08% (W/V) |
| Glycine | 0.1% (W/V) |
| pH Adjustor (sodium hydroxide, glucono-δ-lactone) | qs |
| Pure water | qs |
| pH 9.5 | |
| (7) Substance to be tested 7 | |
| Name: Olanexidine formulation pH 10 | |
| Composition: Olanexidine gluconate | 1.5% (W/V) |
| Pluronic L-44 | 16.08% (W/V) |
| Glycine | 0.1% (W/V) |
| pH Adjustor (sodium hydroxide, glucono-δ-lactone) | qs |
| Pure water | qs |
| pH 10 | |
| (8) Substance to be tested 8 | |
| Name: Olanexidine formulation pH 12 | |
| Composition: Olanexidine gluconate | 1.5% (W/V) |
| Pluronic L-44 | 26.08% (W/V) |
| L-Arginine | 0.1% (W/V) |

-continued

| | |
|---|---|
| pH Adjustor (sodium hydroxide, glucono-δ-lactone) | qs |
| Pure water | qs |
| pH 12 | |

(9) Control Substance

Name/Abbreviated name: Antiseptic ethanol “Kenei”/70% EtOH Manufacturer and distributor: KENEI Pharmaceutical Co., Ltd.

Composition: Ethanol ($C_2H_6O$) content is 76.9 to 81.4% (V/V).

2-1-2 Medium (1) 702 Liquid Medium

To 1 L of pure water, 10 g of Polypepton, 2 g of a Yeast extract, and 1 g of $MgSO_4 \cdot 7H_2O$ were added and steam-sterilized under pressure (121 °C, 20 minutes).

(2) Soft Agar Medium

To 0.5 L of pure water, 5 g of Polypepton, 1 g of a Yeast extract, 0.5 g of $MgSO_4 \cdot 7H_2O$, and 3.5 g of agar for a medium were added and steam-sterilized under pressure (121 °C, 20 minutes).

(3) Agar Plate

To 64 g of a trypto-soya agar medium (SCD agar medium) “Nissui”, 1.6 L of pure water was added and stirred. The medium was steam-sterilized under pressure (121 °C, 20 minutes). About 20 mL each of the agar, before set, was dispensed in petri dishes and allowed to be solidified.

2-1-3 Neutralizer

To about 800 mL of distilled water, 100 g of polysorbate 80, 5.0 g of a sodium thiosulfate hydrate, 0.4 g of potassium dihydrogen phosphate, 1 mL of Triton X-100, 10.1 g of disodium hydrogen phosphate anhydrous, and 11.7 g of soy lecithin were added and stirred. Further, 10.0 g of Tamol (R) NN8906 was added, and heated and stirred until dissolved. After dissolution, a 1 mol/L sodium hydroxide solution was added to adjust pH to 7.8 to 7.9. Distilled water was added until the total amount was 1000 mL, and then steam-sterilization under pressure was carried out.

2-1-4 Bacteriophage and Host (1) Bacteriophage

Name/Abbreviated name: *Escherichia coli* phage MS2/MS2 phage

Supply source: National Institute of Technology and Evaluation Biotechnology Center (NBRC)

NBRC No.: 102619

(2) Host

Name/Abbreviated name: *Escherichia coli* (Migula 1895) Castellani and Chalmers 1919/*E.coli* NBRC13965

Supply source: NBRC

NBRC No.: 13965

2-2 Test Method

2-2-1 Host

*E. coli* NBRC 13965 preserved in a casitone medium was inoculated in 5 mL×4 of a 702 liquid medium and cultured by shaking at 35 °C overnight. The cells were added to 180 mL of the 702 liquid medium and further cultured by shaking for 3 hours to use the obtained culture by shaking as a host culture liquid.

2-2-2 Phage Solution

A phage solution prepared to about $6\times10^{12}$ PFU/mL in accordance with a routine method was used.

2-2-3 Viricidal (Phage) Test (1) To 475 μL of the test substance, 25 μL of the phage solution was added. Further, 25 μL of the phage solution was added to 475 μL of distilled water as a control action solution.
(2) The action was allowed to proceed at room temperature for 30 seconds, 1 minute and 3 minutes. The control action solution only had the action time of about 3 minutes.
(3) After the action, 50 μL of the action solution was collected and then 450 μL of the neutralizer was added and stirred. This mixture was prepared to be a $10^1$-fold dilution.
(4) 20 μL of each of the $10^1$-fold dilutions was added to 180 μL of the neutralizer and stirred. This mixture was prepared to be a $10^2$-fold dilution. Same dilution operation was repeated to produce 10-fold dilution series to $10^9$-fold.
(5) To 100 μL of $10^2$- to $10^9$-fold dilutions series, 0.2 mL of the host culture liquid was added and stirred. About 5 mL of a soft agar medium preserved at about 47 °C was added, gently stirred, and then overlaid on the agar plate.
(6) The soft agar medium, after solidified, was cultured at 35 °C overnight.
(7) The number of plaques caused was counted.
(8) A titer ($\log_{10}$ PFU/mL) was calculated using weighted average method [(Equation 1) below]. Further, a $\text{Log}_{10}$ reduction was calculated.

2-2-5 Data Analysis (1) Phage Titer

Phage titer was calculated using the following (Equation 1).

$$PFU/t = (\Sigma c_1 + c_2 + \ldots + c_n) \div ((n_1 + n_2 \times v_2 + \ldots + n_0 \times v_n) \times d) \quad \text{(Equation 1)}$$

t: A dilution amount added to the plate (0.1 mL in the present test)
$c_1$: Total number of plaques of all plates of the minimum dilution factor countable
$c_2$: Total number of plaques of all plates of dilution factor after $c_1$
$c_n$: Total number of plaques of all plates of the maximum dilution factor
$n_1$: Number of plates of $C_1$
$n_2$: Number of plates of $c_2$
$v_2$: Ratio of the dilution factors of $c_1$ to $c_2$ ($10^{-1}$ in the present test)
$n_n$: Number of plates of $c_n$
$v_n$: Ratio of the dilution factors of $C_1$ to $c_n$
d: Dilution factor of $c_1$ A titer (PFU/mL) was converted to common logarithm ($\log_{10}$ PFU/mL) and indicated to the first decimal place by rounding off. When a titer (PFU/mL) was 1 or less, its common logarithm value was 0.

(2) $\text{Log}_{10}$ Reduction (LR)

The viricidal (phage) action was evaluated by a $\text{Log}_{10}$ reduction value.

$$LR = A - B$$

A: Average value of control action solution phage titer (common logarithm value)
B: Phage titer of each of the test substances after acted (common logarithm value)

LR is indicated to the first decimal place by rounding off. Note that when a titer (common logarithm value) of the test substance after acted was 0, LR is indicated as ">(A−3)" because the phage titer has the minimum limit of detection of $3\text{–}\log_{10}$.

2-3 Results

Evaluation results on the viricidal actions of the test substances are shown in Table 4 and FIG. 4.

TABLE 4

Phage killing effect of test substances

| | | $\text{Log}_{10}$ reduction | |
|---|---|---|---|
| Test substance | 30 sec | 60 sec | 180 sec |
| Olanexidine formulation pH 5 | 0.6 | 0.9 | 1.2 |
| Olanexidine formulation pH 7 | 1.6 | 2 | 3 |
| Olanexidine formulation pH 8 | 2.3 | 3.1 | 4.3 |
| Olanexidine formulation pH 8.5 | 3 | 3.6 | 5 |
| Olanexidine formulation pH 9 | 3.1 | 4 | 5.3 |
| Olanexidine formulation pH 9.5 | 3.4 | 4 | 4.5 |
| Olanexidine formulation pH 10 | 3 | 4.1 | 5.2 |
| Olanexidine formulation pH 12 | 7.6 | 8.5 | >8.5 |
| 70% EtOH | 1.9 | 2.9 | 3.9 |

The olanexidine formulation at pH 5 did not substantially show the viricidal action, and the viricidal action of the olanexidine formulation at pH 7 was equal to 70% ethanol used as the control substance, whereas the olanexidine formulations with the pH changed to basic tended to have larger LR as pH increased. The formulations at pH 8 or more had an LR of 3 or higher at 60 seconds and the formulation at pH 8.5 or more had an LR of 3 or higher at 30 seconds thereby to meet a requirement for the viricidal action of an ideal disinfectant of LR 3 or higher. Thus, a basic solution of olanexidine gluconate was revealed to have a practical viricidal activity and such a viricidal activity is intensified as pH increases.

Example 3

3. Action of Ethanol-containing Basic Olanexidine Formulation on Bacteriophage MS2

In the present Example, ethanol was added to a basic olanexidine formulation of pH 9.5 to evaluate a viricidal effect by a test using bacteriophage MS2 for the purpose of confirming the quick-dryness imparting effect and the potentiating effect of the bactericidal activity by an antiseptic alcohol to a basic olanexidine formulation.

3-1 Test Substance

Substances to be tested 1 to 3, Comparative Example 1, and Base (control substance) were prepared by the compositions of the following Table 5.

TABLE 5

| | Amount (in g/100 mL) | | | | |
|---|---|---|---|---|---|
| Ingredient | Substance to be tested 1 | Substance to be tested 2 | Substance to be tested 3 | Comparative Example 1 | Base |
| Olanexidine gluconate | 1.5 | 1 | 0.5 | 1.5 | — |
| Pluronic L-44 | 1.08 | 0.72 | 0.36 | 1.08 | 1.08 |
| Benzyl alcohol | 3.5 | 3.5 | 3.5 | — | 3.5 |
| Hexyldecanol | 0.01 | 0.01 | 0.01 | — | 0.01 |
| Pluronic F-68 | 1 | 1 | 1 | — | 1 |
| Glycyrrhetinic acid | 0.1 | 0.1 | 0.1 | — | 0.1 |
| Glycine | 0.1 | 0.1 | 0.1 | — | 0.1 |
| Glucono-δ-lactone | qs | qs | qs | — | qs |
| Sodium hydroxide | qs | qs | qs | — | qs |
| Ethanol | 70 | 77 | 83 | 70 | 70 |
| Purified water | qs | qs | qs | qs | qs |
| pH | 9.5 | 9.5 | 9.5 | 6.89 | 9.5 |

Further, the following antiseptic ethanol was used as a control.

Name: Antiseptic ethanol "Kenei"

Manufacturer and distributor: KENEI Pharmaceutical Co., Ltd.

Composition: Ethanol ($C_2H_6O$) content is 76.9 to 81.4% (V/V).

3-2 Test Method

Viricidal effects were evaluated by the method using the bacteriophage MS2 described in the above Example 2, 2-1 and 2-2. Note that a phage solution prepared to about $4\times10^{12}$ PFU/mL was used.

3-3 Results

Evaluation results on viricidal actions of the test substances are shown in Table 6 and FIG. 5.

TABLE 6

| | $Log_{10}$ reduction | |
|---|---|---|
| Test substance | 30 sec | 60 sec |
| Substance to be tested 1 (Olanexidine gluconate 1.5%) | 6 | 6.7 |
| Substance to be tested 2 (Olanexidine gluconate 1.0%) | 5.2 | 5.8 |
| Substance to be tested 3 (Olanexidine gluconate 0.5%) | 4.4 | 5 |
| Comparative Example 1 (Olanexidine gluconate 1.5%, pH 6.89) | 2.6 | 3.5 |
| Base | 3.8 | 4.5 |
| Antiseptic ethanol | 2.2 | 3.4 |

The above results showed that the viricidal action increases in a concentration dependent manner of olanexidine gluconate even in the basic olanexidine formulation containing ethanol whereby the viricidal action by olanexidine gluconate is not impeded even when ethanol is added to impart quick-dryness. Further, the basic olanexidine formulation containing ethanol has a higher viricidal action compared with a basic olanexidine formulation which does not contain ethanol, for the reason of which the ethanol-containing basic olanexidine formulation showed to have a practical viricidal action even when an olanexidine gluconate concentration is reduced. Furthermore, a practical viricidal activity (LR 3 or higher) was not found in the ethanol-containing olanexidine formulation having pH of less than 7 (Comparative Example 1), thereby suggesting that, in the basic olanexidine formulation containing ethanol, olanexidine gluconate, ethanol, and basicity synergistically contribute to the viricidal action. Note that, in the present Example, Pluronic F-68 was added for relieving rough skin and moisturization, and no difference in the effect was found even when Pluronic F-68 was 0.5 g/100 mL.

INDUSTRIAL APPLICABILITY

The composition of the present invention, when used, can produce an olanexidine gluconate-containing disinfectant having an improved bactericidal spectrum and an effect on non-enveloped viruses and is thus highly useful in the fields such as medical and nursing, and food and drink industries.

The invention claimed is:

1. A method for antisepsis of a non-enveloped virus, comprising applying a composition comprising olanexidine gluconate and having a pH within a range from 8.5 to 12, to a non-enveloped virus.

2. The method according to claim 1, wherein the composition comprises 0.5 to 5% (W/V) of olanexidine gluconate.

3. The method according to claim 1, wherein the composition further comprises an antiseptic alcohol.

4. The method according to claim 3, wherein the antiseptic alcohol is ethanol.

5. The method according to claim 3, wherein the composition comprises 50 to 85% (V/V) of antiseptic alcohol.

6. The method according to claim 3, wherein the composition comprises olanexidine gluconate and an antiseptic alcohol at a concentration ratio of 1:200 to 1:40.

7. The method according to claim 1, wherein the composition further comprises water.

8. The method according to claim 1, wherein the non-enveloped virus is bacteriophage MS2.

9. The method according to claim 1, wherein the method is a method for antisepsis of a non-enveloped virus on an instrument surface.

10. The method according to claim 1, wherein the method is a method for antisepsis of a non-enveloped virus on a skin surface.

11. The method according to claim 1, comprising applying the composition to the non-enveloped virus as soaked in a substrate, or as filled in an applicator.

12. The method according to claim 1, comprising applying the composition as a scrubbing agent to the non-enveloped virus.

13. The method according to claim 1, comprising applying the composition as a rubbing agent to the non-enveloped virus.

14. The method according to claim 1, comprising applying the composition to the non-enveloped virus with an amount used of 1 to 5 ml per antisepsis, and at a number of times used of within 100 times per day.

15. The method according to claim 2, wherein the composition further comprises an antiseptic alcohol.

16. The method according to claim 15, wherein the antiseptic alcohol is ethanol.

17. The method according to claim 16, wherein the composition comprises 50 to 85% (V/V) of antiseptic alcohol.

18. The method according to claim 17, wherein the composition comprises olanexidine gluconate and an antiseptic alcohol at a concentration ratio of 1:200 to 1:40.

19. The method according to claim 18, wherein the composition further comprises water.

20. The method according to claim 19, wherein the non-enveloped virus is bacteriophage MS2.

* * * * *